United States Patent
Ahn et al.

(10) Patent No.: US 9,629,097 B2
(45) Date of Patent: Apr. 18, 2017

(54) METHOD AND APPARATUS FOR CONFIGURING UPLINK TRANSMISSION POWER BASED ON TIME ALIGNMENT GROUPS

(71) Applicant: LG ELECTRONICS INC., Seoul (KR)

(72) Inventors: Joonkui Ahn, Seoul (KR); Suckchel Yang, Seoul (KR); Yunjung Yi, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/418,888

(22) PCT Filed: Jul. 30, 2013

(86) PCT No.: PCT/KR2013/006843
§ 371 (c)(1),
(2) Date: Jan. 30, 2015

(87) PCT Pub. No.: WO2014/021612
PCT Pub. Date: Feb. 6, 2014

(65) Prior Publication Data
US 2015/0208358 A1 Jul. 23, 2015

Related U.S. Application Data

(60) Provisional application No. 61/678,119, filed on Aug. 1, 2012.

(51) Int. Cl.
*H04W 52/32* (2009.01)
*H04W 52/14* (2009.01)
(Continued)

(52) U.S. Cl.
CPC ......... *H04W 52/146* (2013.01); *H04W 52/34* (2013.01); *H04W 52/367* (2013.01)

(58) Field of Classification Search
None
See application file for complete search history.

(56) References Cited

U.S. PATENT DOCUMENTS 9,137,762 B2 * 9/2015 Ahn ................... H04W 52/146
9,344,242 B2 * 5/2016 Ahn ................... H04W 52/146
(Continued)

FOREIGN PATENT DOCUMENTS

KR 10-2011-0039172 A 4/2011
KR 10-2011-0098768 A 9/2011
(Continued)

*Primary Examiner* — Philip Sobutka
(74) *Attorney, Agent, or Firm* — Birch, Stewart, Kolasch & Birch, LLP

(57) ABSTRACT

Provided are a method and a terminal device for setting uplink transmission power in a wireless communication system. A terminal acquires information on the time alignment group (TAG) for multiple supportable serving cells so as to constitute TAGs, checks whether an overlap section of subframe n and subframe n+1 for uplink transmission exists between TAGs, and sets uplink transmission power so as to scale the uplink transmission power ($P_{CMAX}$) within the range that does not exceed the configured maximum transmission power ($P_{CMAX}$) of the terminal in the checked overlap section. Here, the uplink transmission power considers the maximum transmission power for multiple serving cells contained in the TAGs.

15 Claims, 10 Drawing Sheets

(51) Int. Cl.
*H04W 52/36* (2009.01)
*H04W 52/34* (2009.01)

(56) References Cited

U.S. PATENT DOCUMENTS

2010/0158147 A1   6/2010  Zhang et al.
2011/0085483 A1   4/2011  Yeon et al.
2011/0292874 A1  12/2011  Ho et al.
2013/0051259 A1   2/2013  Kim et al.

FOREIGN PATENT DOCUMENTS

KR  10-2012-0068953 A   6/2012
WO  WO 2010/065759 A3   6/2010

* cited by examiner

METHOD AND APPARATUS FOR CONFIGURING UPLINK TRANSMISSION POWER BASED ON TIME ALIGNMENT GROUPS

CROSS REFERENCE TO RELATED APPLICATIONS

This application is the National Phase of PCT/KR2013/006843 filed on Jul. 30, 2013, which claims priority under 35 U.S.C. 119(e) to U.S. Provisional Application No. 61/678,119 filed on Aug. 1, 2012, all of which are incorporated by reference herein in its entirety.

BACKGROUND OF THE INVENTION

Field of the Invention

The present invention relates to wireless communication and, more particularly, to a method and apparatus for setting uplink transmission power in a wireless communication system, which support a plurality of component carriers.

Related Art

In recent years, the commercialization of long term evolution (LTE) systems, that is, next-generation wireless communication systems, is being supported in earnest. The LTE system is spread more rapidly as a need to guarantee the activity of UE users and to support high-capacity service of high quality for user demands as well as voice services is recognized. The LTE system provides the improvements of low transmission delay, a high transmission rate, a system capacity, and coverage.

To this end, the LTE system supports a carrier aggregation (hereinafter referred to as a 'CA'). The CA means the support of a plurality of carriers and is also called a spectrum aggregation or a bandwidth aggregation. That is, the CA supports multiple component carriers so that data can be transmitted and/or received in a broad band through a plurality of carriers. In this case, each of carriers bundled by a CA is called a component carrier (CC). Each component carrier is defined by a bandwidth and a center frequency.

In order to support the high transmission rate, that is, in order to increase a transmission capacity, to increase the bandwidth may be said to be essential, and to support a large bandwidth when a level of required service is low may cause great power consumption. Meanwhile, a base station may use information about the power of user equipment as a scheme for efficiently using the resources of the user equipment. Such a power control technology of the base station is an essential core technology for minimizing interference factors and reducing the battery consumption of user equipment in order to efficiently distribute resources in wireless communication. To this end, user equipment may determine uplink transmission power based on transmit power control assigned by a base station, a modulation and coding scheme (MCS), and scheduling information, such as a bandwidth.

Furthermore, control of the power of user equipment encounters a more complicated situation because pieces of uplink transmission power of respective component carriers need to be comprehensively taken into consideration due to the introduction of multiple component carriers. The complexity may cause problems in terms of maximum transmission power of user equipment. In general, user equipment needs to operate with power lower than maximum transmission power, that is, transmission power of a permissible range. If a base station performs scheduling that requires transmission power higher than the maximum transmission power, there may be a problem in that actual uplink transmission power exceeds maximum transmission power of user equipment. Accordingly, there is a need to clearly define uplink transmission power of user equipment in which multiple component carriers are taken into consideration.

SUMMARY OF THE INVENTION

The present invention provides a method and apparatus for setting uplink transmission power in a wireless communication system, which support multiple component carriers.

Furthermore, the present invention provides a method and apparatus for setting uplink transmission power in a subframe in which multiple uplink synchronization groups overlap with each other in a wireless communication system.

Furthermore, the present invention provides a method and the apparatus for setting the uplink transmission power of user equipment by taking into consideration the maximum transmission power of serving cells of multiple uplink synchronization groups in a wireless communication system.

In accordance with an embodiment of the present invention, a method for configuring, by user equipment (UE), uplink transmission power in a wireless communication system includes a process of obtaining information about the configuration of time alignment groups (TAGs) of a plurality of serving cells and configuring the TAGs, a process of checking whether an overlap section is present with respect to a subframe n and a subframe n+1 corresponding to the respective TAGs, a process of configuring uplink transmission power $P_{CMAX}$ in the checked overlap section by taking into consideration maximum transmission power of the plurality of serving cells included in the TAGs within a range not exceeding maximum transmission power $P_{CMAX}$ previously configured in the UE, and a process of performing uplink transmission through corresponding serving cells of the TAGs using the uplink transmission power configured in the checked overlap section.

In accordance with an embodiment of the present invention, an apparatus for configuring uplink transmission power of UE in a wireless communication system includes a radio frequency (RF) unit sending and receiving radio signals and a processor connected to the RF unit, wherein the processor obtains information about the configuration of time alignment groups (TAG) of a plurality of serving cells and configuring the TAGs, checks whether an overlap section is present with respect to a subframe n and a subframe n+1 for uplink transmission in the TAGs, configures uplink transmission power $P_{CMAX}$ in the checked overlap section by taking into consideration maximum transmission power of the plurality of serving cells included in the TAGs within a range not exceeding maximum transmission power $P_{CMAX}$ previously configured in the UE, and performs uplink transmission through corresponding serving cells of the TAGs using the uplink transmission power configured in the checked overlap section.

A BS receives uplink data through uplink transmission power from UE by taking the maximum transmission power of a plurality of serving cells into consideration. Accordingly, there is an advantage in that the uplink scheduling of the UE can be performed more efficiently.

In particular, the maximum transmission power of a plurality of serving cells is taken into consideration in a section in which subframes of a plurality of uplink synchronization groups overlap with each other, but uplink transmission power is scheduled so that it complies with the maximum transmission power of UE. Accordingly, there are advantages in that a rule for the maximum transmission power of UE can be observed and thus efficiency of the scheduling of a BS can be promoted.

DESCRIPTION OF EXEMPLARY EMBODIMENTS

Figure 1:
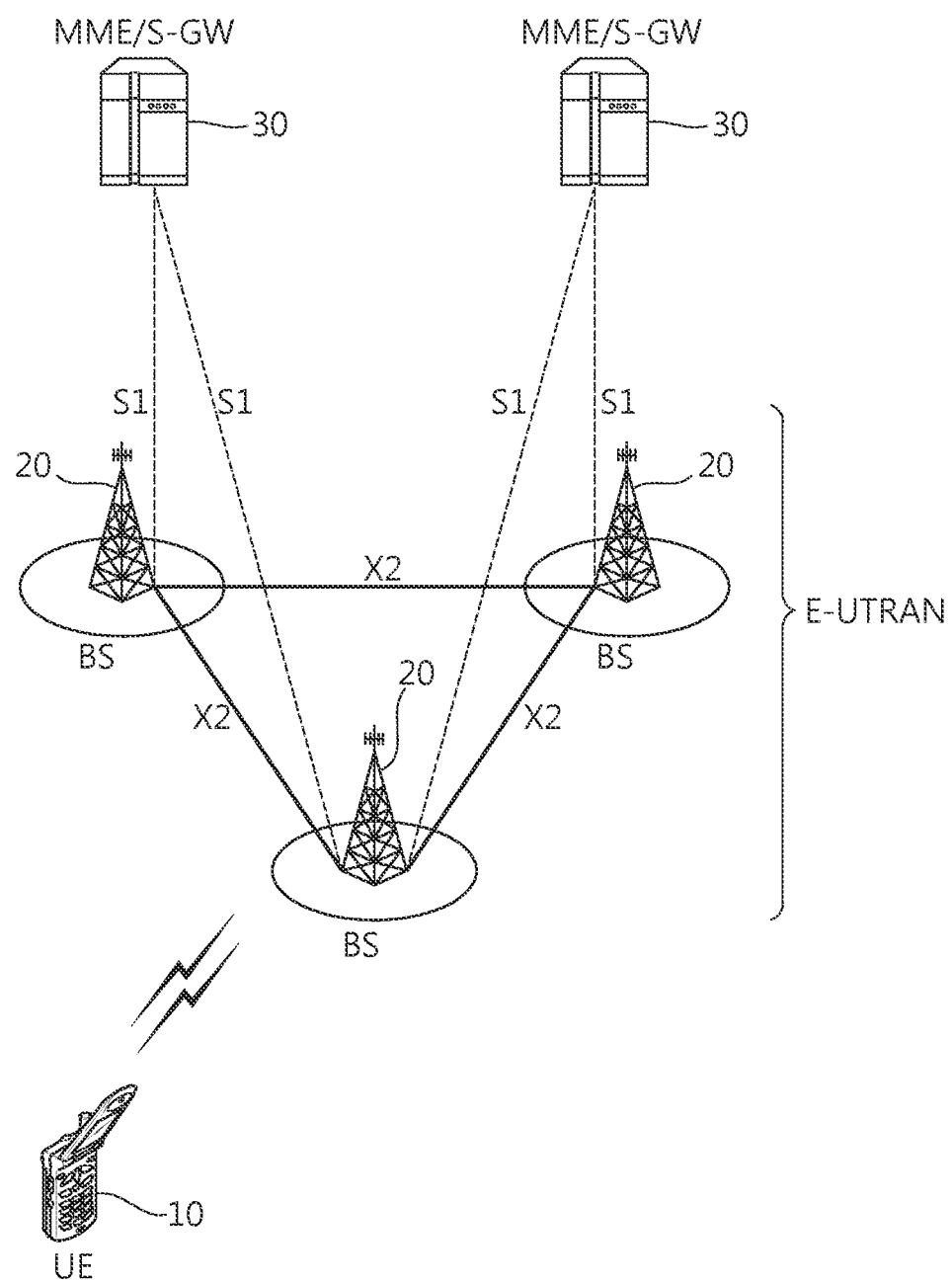
FIG. 1 illustrates a wireless communication system to which the present invention is applied.

Hereinafter, in this specification, some embodiments are described in detail with reference to exemplary drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

In this specification, a communication network is described as a target, and tasks performed in a communication network may be performed in a process of controlling, by a system (e.g., a base station) controlling the communication network, and sending data or may be performed in user equipment linked to the corresponding network.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc. A cell should be interpreted as a comprehensive meaning indicative of some area covered by the BS 11 and has a meaning that covers a variety of coverage areas, such as a mega cell, a macro cell, a micro cell, a pico cell, and a femto cell.

Hereinafter, a downlink indicates communication from BS 11 to UE 10, and an uplink indicates communication from UE 10 to BS 11. A transmitter used in the downlink may be a part of BS 11 and a receiver can be a part of UE 10. A transmitter used in uplink may be a part of UE 11 and a receiver can be a part of BS 11.

Multiple access schemes applied to the wireless communication system to which the present invention is applied are not limited. Various wireless communication systems, such as code division multiple access (CDMA), frequency division multiple access (FDMA), time division multiple access (TDMA), orthogonal frequency division multiple access (OFDMA), and single carrier FDMA (SC-FDMA), OFDM-FDMA, OFDM-TDMA, and OFDM-CDMA, may be used. A Time Division Duplex (TDD) scheme using different times or a Frequency Division Duplex (FDD) scheme using different frequencies may be used in uplink transmission and DL transmission.

The BSs 20 are interconnected by means of an X2 interface. The BSs 20 are also connected by an S1 interface to an evolved packet core (EPC) 30, more specifically, to a mobility management entity (MME) through S1-MME and to a serving gateway (S-GW) through S1-U. In this case, the MME hosts the functions of the control plane, and the S-GW hosts the functions of the user plane.

The EPC 30 includes an MME, an S-GW, and a packet data network-gateway (P-GW). The MME has information about the access of UE or information about the capabilities of UE, and the information is chiefly used for the mobility management of UE. The S-GW is a gateway having an E-UTRAN as an end point, and the P-GW is a gateway having a PDN as an end point.

The layers of a radio interface protocol between UE and a network may be classified into a first layer (L1, a second layer (L2), and a third layer (L3) based on the lower three layers of an open system interconnection (OSI) model that is well-known in communication systems. From among them, a physical (PHY) layer belonging to the first layer provides information transfer service using physical channels, and a radio resource control (RRC) layer belonging to the third layer serves to control radio resources between the UE and the network. To this end, the RRC layer exchanges RRC messages between the UE and the BS.

Figure 2:
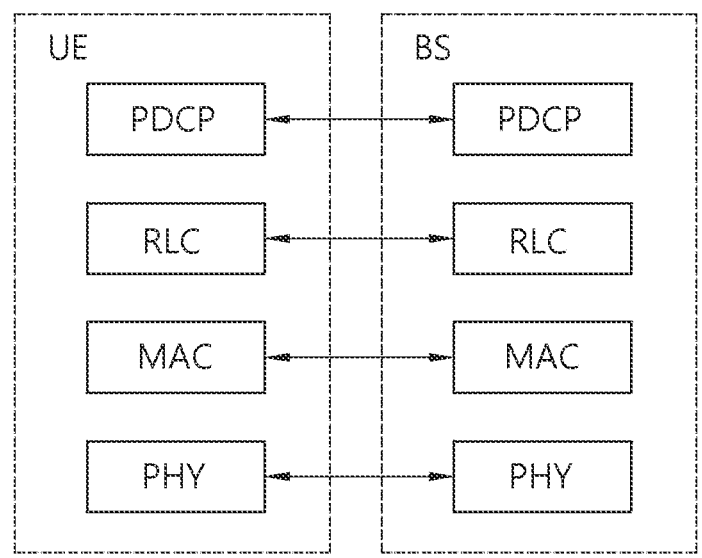
FIG. 2 is a block diagram illustrating a radio protocol architecture for a user plane to which the present invention is applied.
Figure 3:
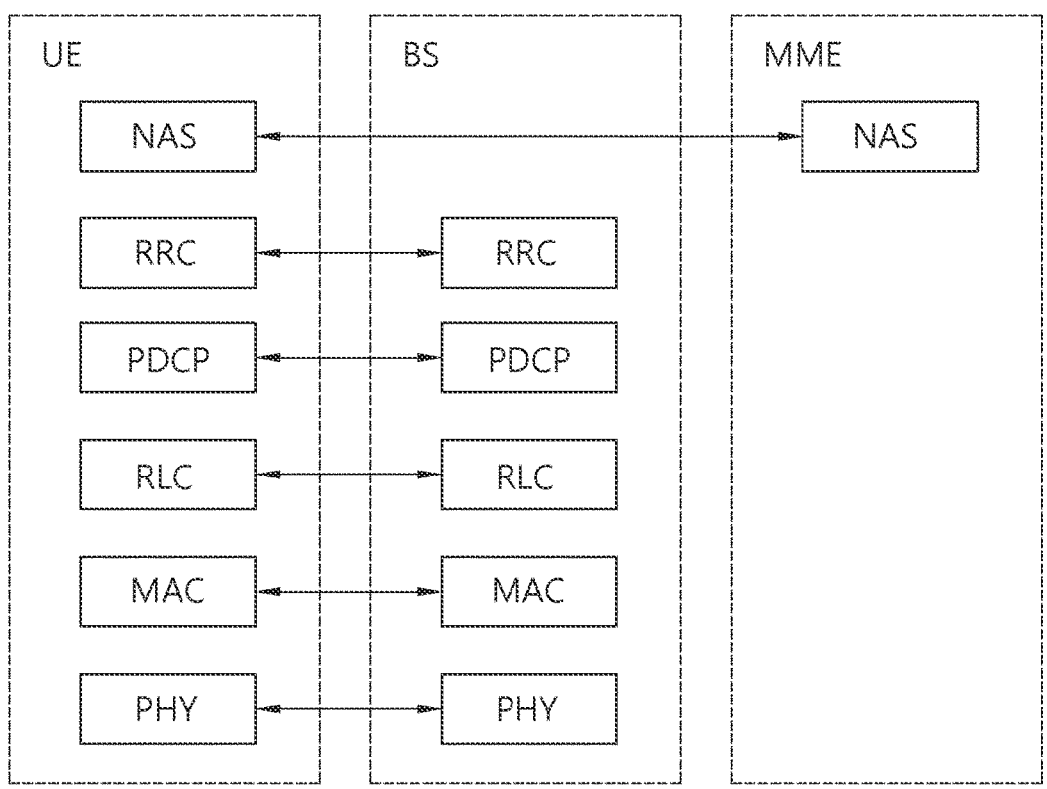
FIG. 3 is a block diagram illustrating a radio protocol architecture for a control plane to which the present invention is applied.

FIG. 2 is a diagram showing a radio protocol architecture for a user plane. FIG. 3 is a diagram showing a radio protocol architecture for a control plane. The user plane is a protocol stack for user data transmission, and the control plane is a protocol stack for control signal transmission.

Referring to FIGS. 2 and 3, physical (PHY) layer 210, 310 provides an upper layer with information transfer service through physical channels. The PHY layer is connected to a medium access control (MAC) layer 220, 320 which is an upper layer of the PHY layer through a transport channel. Data is transferred between the MAC layer and the PHY layer through the transport channel. The transport channel is classified according to how and with what characteristics data is transferred through a radio interface.

Data is transferred through the physical channel between different PHY layers, that is, the PHY layer of a transmitter and the PHY layer of a receiver. The physical channel may be modulated using an orthogonal frequency division multiplexing (OFDM) scheme, and may utilize time and frequency as a radio resource.

The functions of the MAC layer 220 include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer 230, 330 through the logical channel.

The functions of the RLC layer 230 include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

The functions of a packet data convergence protocol (PDCP) layer 240, 340 in the user plane include user data delivery, header compression, and ciphering. The functions of a PDCP layer in the control plane include control-plane data delivery and ciphering/integrity protection.

A radio resource control (RRC) layer 350 is defined only in the control plane. The RRC layer 350 serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The configuration of an RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When RRC connection is established between the RRC layer of UE and the RRC layer of a network, the UE is in an RRC-connected state (also referred to as RRC-connected mode). In contrast, if not, the UE is in an RRC idle state (also referred to as RRC idle mode). There are some physical channels.

A non-access stratum (NAS) control protocol 360 is terminated at the MME on the network side and performs the management of EPS bearers, authentication, and ciphering control.

Data is transmitted from the network to the UE through downlink transmission channels. For example, the downlink transmission channels include a broadcast channel (BCH) for sending system information and a downlink shared channel (SCH) for sending user traffic or control messages. The user traffic or control messages for downlink multicast or broadcast services may be transmitted through a downlink-SCH or additionally a downlink multicast channel (MCH). Data may also be transmitted by the UE through uplink transmission over a network. For example, an uplink transmission channel includes a random access channel (RACH) for sending an initial control message and an uplink-SCH for sending user traffic or control messages.

Logic channels corresponding to an upper channel of a transmission channel mapped to transmission channels may include, for example, a broadcast channel (BCCH), a paging channel (PCCH), a common control channel (CCCH), a multicast control channel (MCCH), and a multicast traffic channel (MTCH).

The physical channel includes a plurality of OFDM symbols in a time domain and a plurality of subcarriers in a frequency domain. A single subframe includes a plurality of OFDM symbols in a time axis. A resource block is a resource allocation unit and includes a plurality of OFDM symbols and subcarriers. Additionally, each subframe uses specific subcarriers of a specific OFDM symbol (e.g., the first symbol) of a corresponding subframe for a physical downlink control channel (PDCCH), for example, for L1/L2 control channels. A transmission time interval (TTI) is a time unit for subframe transmission.

Figure 4:
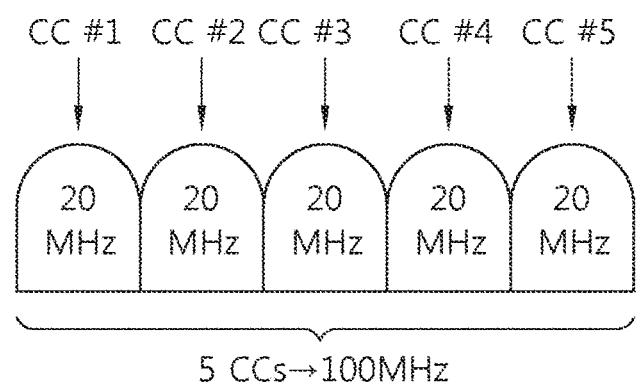
FIG. 4 illustrates an example of multiple carriers to which the present invention is applied.

FIG. 4 is a diagram schematically illustrating the definition of a carrier aggregation (CA) to which the present invention is applied.

Referring to FIG. 4, a CA may be divided into a contiguous CA performed between continuous CCs and a non-contiguous CA performed between non-contiguous CCs in a frequency domain. The number of carriers aggregated in downlink may be configured differently from the number of carriers aggregated in uplink. A case where the number of downlink CCs is equal to the number of uplink CCs is called a symmetric aggregation, and a case where the number of downlink CCs is different from the number of uplink CCs is called an asymmetric aggregation. In multiple carrier system, a contiguous CA and/or a non-contiguous CA may be used. Furthermore, either a symmetric aggregation or an asymmetric aggregation may be used. Furthermore, the size (i.e., bandwidth) of a component carrier may be different.

For example, there are five CCs, that is, a CC #1, a CC #2, a CC #3, a CC #4, and CC #5, and each CC has a 20 MHz bandwidth. If 5 CCs are allocated with the granularity of a unit carrier having a 20 MHz bandwidth, a maximum bandwidth of 100 MHz can be supported. In this case, the bandwidth of the CC or the number of CCs is only illustrative. Furthermore, the number of downlink CCs may be equal to or different from the number of uplink CCs.

Furthermore, a CC may be divided into a fully configured carrier and a partially configured carrier depending on its directivity. The fully configured carrier refers to a carrier in which all the control signals and data may be transmitted and/received through a bidirectional carrier. The partially configured carrier refers to a carrier in which only downlink data may be transmitted through a unidirectional carrier. The partially configured carrier may be chiefly used in multicast and broadcast service (MBS) and/or a Single Frequency Network (SFN).

As described above, the MAC layer may manage one or more CCs. The MAC layer may include one or more HARQ entities. A single HARQ entity may perform HARQ on a single CC. In each HARQ entity, a transmission block on a transmission channel may perform independent processing. Accordingly, a plurality of HARQ entities may send or receive a plurality of transmission blocks through a plurality of CCs.

A single CC (or a CC pair of a downlink CC and an uplink CC) may correspond to a single cell. When a synchronization signal and system information are provided through each downlink CC, each downlink CC may correspond to a single serving cell. If UE is provided with service using a plurality of downlink CCs, the UE may be said to be provided with service from a plurality of serving cells.

Furthermore, a BS may provide UE with a plurality of serving cells using a plurality of downlink CCs. Accordingly, the BS and the UE may communicate with each other using the plurality of serving cells.

In this case, the serving cell may be divided into a primary serving cell and a secondary serving cell. The primary serving cell is always activated, and it operates in a primary frequency, initiates the RRC establishment or re-establishment procedure of UE, and provides security input and NAS mobility information. The secondary serving cell may be activated or deactivated, may operate in a secondary frequency, may be configured when RRC connection is established, and may be used to provide additional radio resources. The primary serving cell may be configured as a pair of a downlink CC and an uplink CC, and the secondary serving cell may be configured as a pair of a downlink CC and an uplink CC or only a downlink CC.

As described above, UE may include a single primary serving cell or a single primary serving cell and at least one or more secondary serving cells as a set of serving cells depending on its capabilities.

Power Headroom (PH) is described below. PH means surplus power that may be additionally used by UE in addition to power currently used for uplink transmission.

For example, it is assumed that the maximum transmission power of UE, that is, transmission power of a permissible range, is 10 W. Assuming that UE uses power of 9 W in a frequency band of 10 MHz, the UE may use 1 W additionally, and 1 W that may be additionally used becomes PH. In this case, if a BS allocates a frequency band of 20 MHz to the UE, UE requires actual power of 9 W (power consumed in the frequency band of 10 MHz)×2=18 W.

If 20 MHz is allocated to the UE because the maximum power of the UE is 10 W, however, the UE may not use the entire frequency band or the BS may not properly receive a signal from the UE because power is insufficient.

Accordingly, in order to solve the problem, the UE reports to the BS that the PH is 1 W, and the BS controls transmission power so that scheduling is performed within the PH range by taking the PH of the UE. This report is called a power headroom report (PHR). That is, the power headroom means power that may be additionally used by the UE compared to currently used transmission power. Power headroom may mean a difference between the maximum transmission power of UE and currently used transmission power.

That is, as described above, the power headroom report is used to explicitly provide the BS of a difference between the maximum transmission power of the UE and estimated power attributable to UL-SCH transmission. <Equation 1> below defines power headroom in a subframe i.

$$PH(i) = P_{CMAX} - \{10 \log_{10}(M_{PUSCH}(i)) + P_{O\_PUSCH}(j) + \alpha(j)PL + \Delta_{TF}(i) + f(i)\}$$ Equation 1

In Equation 1, $P_{CMAX}$ is maximum transmission power configured in UE, $M_{PUSCH}(i)$ is a bandwidth for PUSCH resource allocation that is represented by the number of resource blocks in the subframe i, PL is DL pathloss estimation calculated by the UE, $P_{O\_PUSCH}(j)$, $\alpha(j)$, $\Delta_{TF}(i)$, and $f(i)$ are parameters obtained from higher layer signaling.

Meanwhile, a PHR may be triggered as follows.

When UE has UL resources for new transmission, when a prohibition timer expires, transmission is PHR transmission, and a pathloss is greatly changed compared to a pathloss threshold, When a periodic timer expires.

A configuration or reconfiguration for a PHR function

If resources for new transmission are allocated to UE in a TTI:

If the resources are the first UL resources for the new transmission after the last MAC resetting, a periodic timer is started;

If at least one PHR is triggered after the last transmission of a PHR and the triggered PHR is the first triggered PHR, and;

If allocated UL resources may accommodate PHT MAC control elements as a result of logical channel prioritization (LCR):

A power headroom value is obtained from a physical layer;

A PHR MAC control element is generated and indicated based on a value reported by the physical layer;

A periodic timer is started or restarted;

A prohibition timer is started or restarted;

All the triggered PHRs are cancelled.

Power headroom is transmitted as an MAC control element (CE).

In order to trigger the power headroom report, that is, RRC sets a pathloss threshold whose change is set in two (i.e., a periodic timer and a prohibition timer) and a measured DL pathloss and controls the power headroom report. In this case, a pathloss estimate is measured by UE based on reference symbol received power (RSRP).

Figure 5:
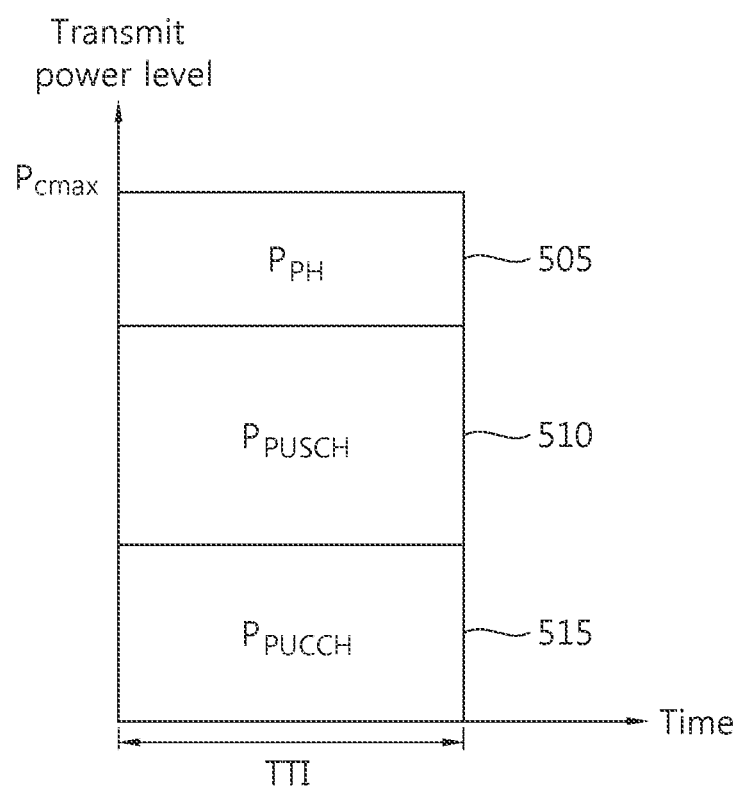
FIG. 5 is a diagram schematically illustrating the concept of uplink transmission power to which the present invention is applied.

FIG. 5 is a diagram schematically illustrating the concept of power headroom to which the present invention is applied.

Referring to FIG. 5, the configured maximum transmission power $P_{cmax}$ of UE includes $P_{PH}$ 505, $P_{PUSCH}$ 510, and $P_{PUCCH}$ 515. That is, the remainder other than the $P_{PUSCH}$ 510 and the $P_{PUCCH}$ 515 in $P_{cmax}$ is defined as the power of the $P_{PH}$ 505. Each of the pieces of power is calculated every transmission time interval (TTI).

That is, PH is defined as a difference between the maximum transmission power $P_{cmax}$ configured in the UE and $P_{estimated}$ estimated regarding uplink transmission as in <Equation 2> and is represented in dB.

$$P_{PH} = P_{cmax} - P_{estimated} [dB]$$ Equation 2

$PH_{PH}$ may also be called power headroom (PH), remaining power, or surplus power. That is, the remaining value obtained by subtracting the $P_{estimated}$, that is, the sum of transmission power used in each component carrier, from the maximum transmission power of UE configured by a BS is a $P_{PH}$ value.

For example, $P_{estimated}$ estimated is equal to power $P_{PUSCH}$ estimated regarding the transmission of a physical uplink shared channel (hereinafter called a PUSCH). Accordingly, in this case, $P_{PH}$ may be calculated using <Equation 3>. The <Equation 3> corresponds to a case where only a PUSCH is transmitted in uplink, which is called Type 1. PH according to Type 1 is called Type 1 PH.

$$P_{PH} = P_{cmax} - P_{PUSCH} [dB]$$ Equation 3

For another example, $P_{estimated}$ estimated is equal to the sum of power $P_{PUSCH}$ estimated regarding the transmission of a PUSCH and power $P_{PUCCH}$ estimated regarding the transmission of a physical uplink control channel (hereinafter call a PUCCH). Accordingly, in this case, PH may be calculated by <Equation 4>. The <Equation 4> corresponds to a case where a PUSCH and a PUCCH are transmitted in uplink at the same time, which is called Type 2. PH according to Type 2 is called Type 2 PH.

$$P_{PH} = P_{cmax} - P_{PUCCH} - P_{PUSCH} [\text{dB}] \quad \text{Equation 4}$$

The PH according to <Equation 4> may be represented as in FIG. 5 in the form of a graph in a time-frequency axis. In order to facilitate a description, FIG. 5 illustrates the PH of a single CC. As described above, UE reports its surplus power to a BS in order to help efficiency of the scheduling of the BS.

Meanwhile, in a multiple component carrier system, surplus power may be individually defined regarding a plurality of configured CCs. The configured maximum transmission power $P_{max}$ of UE is equal to the sum of pieces of maximum transmission power $P_{CC\ \#1}, P_{CC\ \#2}, \ldots, P_{CC\ \#N}$ of respective CC #1, CC #2, ..., CC #N. The maximum transmission power of each CC may be generalized as in the following equation.

$$P_{CC_i} = P_{max} - \sum_{j \neq i} P_{CC_j} \quad \text{Equation 5}$$

The $P_{PH}$ of the CC #1 is equal to $P_{CC\ \#1} - P_{PUSCH} P_{PUCCH}$, and the $P_{PH}$ of the CC #n is equal to $P_{CC\ \#n} - P_{PUSCH} - P_{PUCCH}$. As described above, in a multiple component carrier system, maximum transmission power configured in UE needs to take the maximum transmission power of each component carrier into consideration. Accordingly, it may be defined differently from maximum transmission power in a single component carrier system.

Meanwhile, when an uplink grant that permits uplink data transmission is received from a BS through a PDCCH at a specific time (or subframe) t0, UE needs to calculate a transmission power amount in response to the uplink grant at the specific time t0.

At the time t0, the UE calculates primary transmission power by taking into consideration a value, that is, weight (received from the BS), in a PUSCH power offset value and TPC value received from the BS and a pathloss (hereinafter called a PL) between the BS and the UE. The primary transmission power (1st Tx power) is a result of a parameter affected by a path environment between the BS and the UE and a parameter determined by a network policy. In addition, the UE calculates secondary transmission power ($2^{nd}$ Tx power) by taking into consideration a QPSK modulation method included in an uplink grant and a scheduling parameter indicative of the allocation of 10 resource blocks (RB). The secondary transmission power is transmission power changed through the uplink scheduling of the BS. Accordingly, the UE may calculate the final uplink transmission power by adding up both the primary transmission power and the secondary transmission power. In this case, the final uplink transmission power may not exceed maximum transmission power $P_{cmax}$ configured in the UE.

The maximum transmission power configured in the UE as described above is affected by the power coordination of the UE. Power coordination means that the maximum transmission power configured in the UE is reduced within a permitted specific range and may be called a maximum power reduction (MPR). Furthermore, the amount of power reduced by power coordination is called a power coordination amount. The reason why the maximum transmission power configured in the UE is reduced is as follows. There is a case where maximum transmission power needs to be limited depending on the type of signal that needs to be currently transmitted based on a hardware configuration (in particular, radio frequency (RF)) within UE.

A range of maximum transmission power in which power coordination has been taken into consideration is equal to the following equation.

$$P_{cmax-L} \leq P_{cmax} \leq P_{cmax-H} \quad \text{Equation 6}$$

In Equation 6, $P_{cmax}$ is maximum transmission power configured in UE, $P_{cmax-L}$ is a minimum value of Pcmax, and a maximum value of $P_{cmax-H}$ is a maximum value of $P_{cmax}$. More specifically, $P_{cmax-L}$ and $P_{cmax-H}$ are calculated by the following equations.

$$P_{cmax-L} = \text{MIN}[P_{Emax} - \Delta T_C, P_{powerclass} - PC - APC - \Delta T_C] \quad \text{Equation 7}$$

$$P_{cmax-H} = \text{MIN}[P_{Emax}, P_{powerclass}] \quad \text{Equation 8}$$

In this case, MIN[a,b] is a small value of a and b, and $P_{Emax}$ is maximum power determined by the RRC signaling of a BS. $\Delta TC$ is the amount of power applied when there is uplink transmission at the edge of a band, and it has 1.5 dB or 0 dB depending on the bandwidth. $P_{powerclass}$ is a power value according to several power classes defined in order to support the specifications of various types of UE in a system.

In general, in LTE systems, UE supports UE power class 3, and $P_{powerclass}$ according to the power class 3 is 23 dBm. PC is the amount of power coordination, and additional power coordination (APC) is the amount of additional power coordination signaled by a BS.

Power coordination may be set as a specific range or may be set as a specific constant. Power coordination may be defined in a UE unit, may be defined every CC, or may be set as a specific range or constant within each CC. Furthermore, power coordination may be set as a range or constant depending on whether the PUSCH resource allocation of each CC is contiguous or non-contiguous. Furthermore, power coordination may be set as a range or constant depending on whether a PUCCH is present.

Meanwhile, in LTE systems, if UE aggregates a plurality of CCs, UL transmission is performed by 'commonly' applying a timing advance (TA) value that is applicable to a single CC (e.g., a PCell or PCC) to a plurality of CCs.

Furthermore, there is a possibility that future UE may aggregate a plurality of CCs that belong to different bands or that are spaced apart greatly on a frequency, that is, plurality of CCs having different frequency propagation characteristics. Furthermore, in a specific one of a plurality of CCs, a case where apparatuses, such as a remote radio header (RRH), that is, a repeater, may be present in a cell need to taken into consideration in order to expand coverage or remove a coverage hole.

In this case, if UL transmission is performed using a method of commonly applying a single TA value to a plurality of CCs, the synchronization of UL signals transmitted by a plurality of CCs may be severely affected. For example, it is assumed that UE aggregates two CCs, one of the two CCs is transmitted and received using an RRH for reason of limited coverage, and the other of the two CCs is directly communicated with a BS without an RRH. In this case, propagation delay when direction communication is performed through a CC1, that is, through a radio channel between the BS and the UE, and the propagation delay of an UL signal transmitted through a CC2, that is, via an RRH, may be different for reason of the processing time of the RRH.

Figure 6:
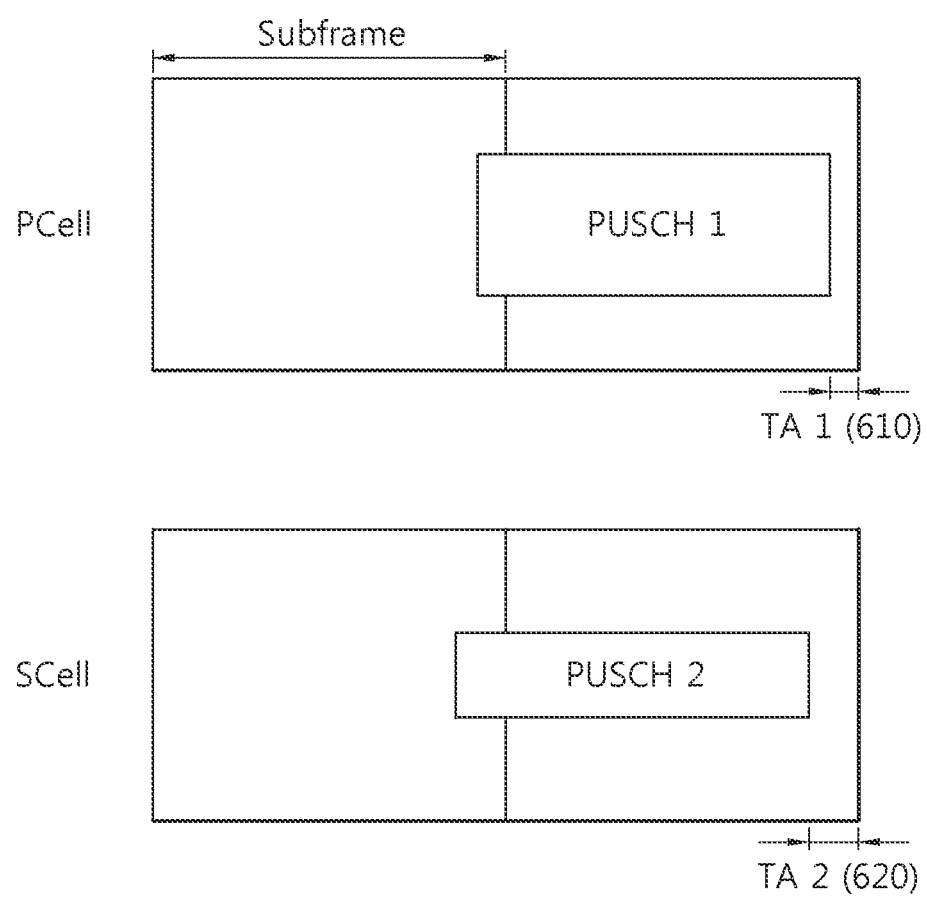
FIG. 6 is a diagram illustrating an example of the concept of timing advance values used in multiple uplink synchronization groups in a wireless communication system to which the present invention is applied.

If a plurality of CCs has different propagation delay characteristics as described above, a plurality of timing advances (TA) is inevitable. As illustrated in FIG. 6, there may be a case where UE aggregates two CCs and sends an UL signal (PUSCH) using different TAs.

The present invention proposes a method of controlling uplink maximum transmission power in a random access procedure performed through an SCell or an SCell group with respect to cells or cell groups that operate as independent UL TAs.

In the present invention below, an example in which independent TAs are applied to different cells is described, but the present invention may be identically applied to a method of applying independent TAs to cell groups including one or a plurality of cells. A cell to which a TA described in the present invention is applied may mean a cell group using an independent TA. Furthermore, a PCell (or a PCell group) may be a cell group to which the same TA is applied by binding a single PCell or a single PCell and one or more SCells, and an SCell (or SCell group) may be a cell group to which the same TA is applied by binding one or a plurality of SCells.

For convenience sake, in the present invention, a group of cells to which the same TA is applied is called a TA group (TAG), a TAG to which a PCell belongs is called a pTAG, and a TAG to which a PCell does not belong is called an sTAG. A single TAG may include one or more cells.

In other words, in a multiple component carrier system, assuming that a piece of UE performs communication with a BS through a plurality of component carriers or a plurality of serving cells, if all the signals transmitted to the BS through the plurality of serving cells have the same time delay, the UE may obtain uplink synchronization for all the serving cells as a single TA value. If all the signals transmitted to the BS through the plurality of serving cells have different time delay, however, a different TA value is required for each serving cell. That is, multiple TA values are required.

In this case, if the UE performs a random access procedure on each of the serving cells in order to obtain the multiple TA values, overhead is generated in limited uplink and downlink resources because the number of random access procedures required to obtain the uplink synchronization is increased, and the complexity of a synchronization tracking procedure for maintaining the uplink synchronization may be increased. In order to reduce the overhead and complexity, a timing alignment group (TAG) is defined, and the TAG may also be called a timing advance group. That is, a TAG is a group including a serving cell(s) that belongs to serving cells in which an UL CC has been configured and that uses the same TA value and the same timing reference or a timing reference cell including the timing reference.

For example, if a first serving cell and a second serving cell belong to a TAG1 and a second serving cell is a timing reference cell, the same TA value TA 1 are applied to the first serving cell and the second serving cell. The first serving cell may apply the TA 1 value on the basis of a downlink point of time at which the DL CC of the second serving cell is synchronized. In this case, a primary serving cell does not change a TAG. Furthermore, UE needs to support at least two TAGs if multiple TA values are required.

For example, a TAG divided into a primary TAG (pTAG) including a primary serving cell and a secondary TAG (sTAG) not including a primary serving cell needs to be supported. In this case, one pTAG may be always present, and at least one sTAG may be present if multiple TA values are required. A maximum number of TAGs may be set to 2 or 4. Furthermore, a pTAG may always have a value of a TAG ID=0 or may have no value.

In accordance with an example of the present invention, it is assumed that a pTAG has a value of a TA 1 610 and an sTAG has a value of a TA 2 620. Accordingly, a corresponding serving cell belonging to each TAG performs uplink transmission (PUSCH) in each serving cell by applying the TA value of a corresponding group. That is, a serving cell belonging to the pTAG performs uplink transmission (PUSCH) in each serving cell by applying the TA 1 610, and a serving cell belonging to the sTAG performs uplink transmission (PUSCH) in each serving cell by applying the TA 2 620.

In this case, when UE performs uplink signal transmission through a plurality of TA groups, if contiguous subframes of different TA groups overlap with each other in some time interval, a value of maximum power $P_{CMAX}$ needs to be defined in the section in which the overlap of transmission occurs. Furthermore, the UE needs to perform transmission within a range not exceeding the maximum transmission power.

More specifically, if the maximum power of the UE is not defined by taking maximum transmission power in each serving cell into consideration, for example, as described above, if power consumed in each frequency band is fully used by not taking the maximum transmission power of the UE into consideration, the frequency band of each serving cell allocated for a CA may not be fully used, or a BS may not properly receive a signal from the UE due to insufficient power.

Figure 7:
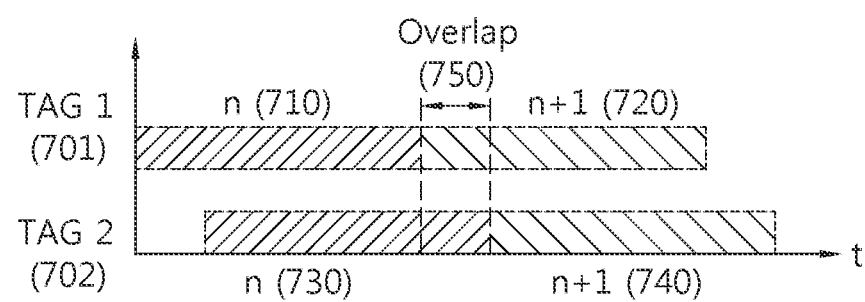
FIG. 7 is a diagram illustrating an example in which subframes overlap with each other between multiple uplink synchronization groups (TAG) in a wireless communication system to which the present invention is applied.

FIG. 7 illustrates an example in which the boundaries of the subframes of cells belonging to two TAGs, respectively, overlap with each other in a wireless communication system to which the present invention is applied.

Referring to FIG. 7, 750, that is, an overlap section, is the section in which an $(n+1)^{th}$ subframe 720 after an $n^{th}$ subframe 710 is maintained with respect to a TAG1 including a PCell and is the section in which an $n^{th}$ subframe 730 is maintained with respect to a TAG2 including an SCell.

In an environment in which a plurality of TAGs is present as described above, if UE sends the uplink grant of a BS that permits uplink data transmission through a PDCCH, the amount of transmission power in which serving cells belonging to a plurality of TAGs are taken into consideration needs to be calculated.

In relation to this, in the present invention, a method of configuring maximum power in the section in which two subframes overlap with each other may be set as one of the followings. This is described with reference to FIG. 8.

Figure 8:
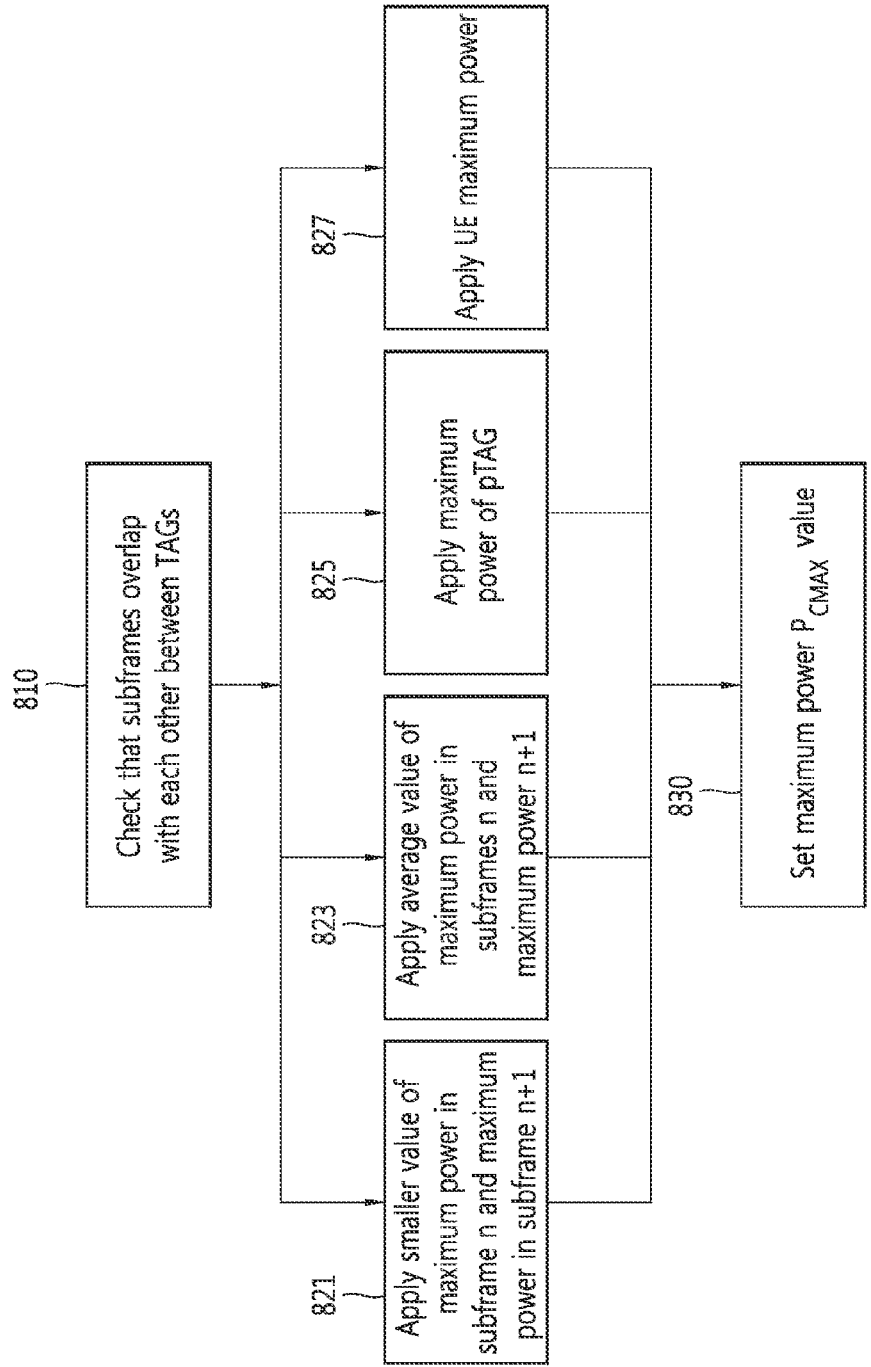
FIG. 8 is a diagram schematically illustrating various schemes in which subframes set the maximum transmission power of UE between multiple uplink synchronization groups (TAG) in accordance with an embodiment of the present invention.

FIG. 8 is a diagram schematically illustrating various schemes in which subframes configured the maximum transmission power of UE between multiple uplink synchronization groups (TAG) in accordance with an embodiment of the present invention.

Referring to FIG. 8, the UE checks that there is the section in which corresponding subframes of a corresponding TAG overlap with each other in an environment in which a plurality of TAGs is present (810).

Furthermore, a method of configuring maximum power in the section in which subframes overlap with each other may be set as one of the followings.

Method 1) a Smaller Value of Maximum Power in a Subframe n and Maximum Power in a Subframe n+1 is Applied (821)

Maximum power in a specific subframe is calculated based on UE maximum power (defined as a UE power class) and a power coordination (MPR) value determined by the transmission aspect (RB allocation, modulation order, etc.) of UE in a corresponding subframe. The transmission aspect of the UE in the section in which the subframe n and the subframe n+1 overlap with each other is different from that in each subframe n or n+1. Accordingly, it is difficult to precisely induce maximum power in the two subframes through maximum power in each subframe.

For a conservative operation so that the maximum power of UE does not exceed an actually required maximum power limit, however, a smaller value of pieces of maximum power in two consecutive subframes may be applied to the section in which the two subframes overlap with each other.

In other words, in configuring maximum power in the section in which subframes overlap with each other, the UE selects a power value having a smaller value of maximum power $P_{CMAX\_}1$ calculated in the $(n+1)^{th}$ subframe of a serving cell belonging to a TAG1 and maximum power $P_{CMAX\_}2$ calculated in the $n^{th}$ subframe of a serving cell belonging to a TAG2 including an SCell and sets the selected power value as the maximum power of the UE.

For example, the UE compares the $P_{CMAX\_}1$ with the $P_{CMAX\_}2$ and configures the $P_{CMAX\_}1$ having a smaller value as UE maximum power in the subframe of the overlapped section (830).

Furthermore, as described above, the maximum transmission power configured in the UE is influenced by the power coordination (MPR) of the UE. Accordingly, the UE may configure a power coordination (MPR) that belongs to MPRs applied by the respective serving cells of a corresponding TAG group in the section in which the $n^{th}$ and the $(n+1)^{th}$ subframes overlap with each other and that has a greater value to the overlap section and may set the calculation of the maximum power of the UE.

Method 2) Apply the Average Value of Pieces of Maximum Power in the Subframes n and n+1(823)

In order to prevent maximum power in the section in which the subframe n and the subframe n+1 overlap with each other from being set to be excessively great or small, the average value of pieces of maximum power in two consecutive subframes may be applied.

In other words, in configuring maximum power in the section in which subframes overlap with each other, UE sets the average value of maximum power $P_{CMAX\_}1$ in the $(n+1)^{th}$ subframe of a serving cell belonging to a TAG1 and maximum power $P_{CMAX\_}2$ in the $n^{th}$ subframe of a serving cell belonging to a TAG2 including an SCell as the maximum power of the UE.

For example, the UE sets $(P_{CMAX\_}1+P_{CMAX\_}2)/2$ as the maximum power of the UE in the section in which subframes overlap with each other (830).

Method 3) Apply the Maximum Power of a TA Group to which a PCell Belongs (825)

In an LTE system, a PCell is a cell that is important to maintain connection to the network of UE compared to an SCell because it is used to send UL ACK/NACK and is a criterion for radio link monitoring. Accordingly, maximum power in a subframe to which a PCell belongs may be applied as maximum power in the section in which two subframes overlap with each other. That is, if a PCell belongs to the TAG1 in the example of FIG. 7, maximum power calculated in the $(n+1)^{th}$ subframe is applied in the section in which the $(n+1)^{th}$ subframe of the TAG1 and the $n^{th}$ subframe of the TAG2 overlap with each other. This is a method of applying the maximum power of a subframe to which a cell having the smallest cell index belongs in the section in which two subframes overlap with each other and includes the application of the maximum power of UE.

In other words, in configuring maximum power in the section in which subframes overlap with each other, the UE checks maximum power $P_{CMAX\_}1$ in the $(n+1)^{th}$ subframe of a serving cell belonging to the TAG1 and maximum power $P_{CMAX\_}2$ in the $n^{th}$ subframe of a serving cell belonging to the TAG2 including an SCell and configures the maximum power $P_{CMAX\_}1$ in the $(n+1)^{th}$ subframe of the serving cell belonging to the TAG1 as the maximum power of the UE.

For example, the UE may configure $P_{CMAX\_}c_{c0}$, that is, maximum power in the subframe of a TAG to which a PCell belongs, as the maximum power of the UE in the overlapped section (830).

Method 4) Apply the UE Maximum Power (827)

As described above, an MPR value is also different because a transmission aspect in the section in which consecutive subframes overlap with each other may be different from that in each subframe. Since an MPR value in a short interval in which two subframes overlap with each other may be meaningless, UE maximum power defined by a UE power class by not taking into consideration an MPR in the section in which two subframes overlap with each other or maximum power obtained by adding or subtracting a specific offset value to or from the UE maximum power may be configured.

For example, the UE configures the maximum power of the UE in the section in which the subframes overlap with each other through $P_{CMAX}$=MIN $\{P_{PowerClass}, P_{EMAX,c}, \Delta T_{C,c}\}$ (830).

In this case, $P_{PowerClass}$ is UE maximum power defined by a UE power class, $P_{EMAX,c}$ is maximum power configured for a corresponding serving cell, and $\Delta T_{C,c}$ is a specific offset value in a corresponding serving cell.

Furthermore, more characteristically, in the present invention, the maximum power of UE in the section in which consecutive subframes overlap with each other may be set as a smaller value of UE maximum power defined by a UE power class and the sum of pieces of maximum permission power configured by network signaling, such as RRC signaling, for each of cells aggregated by the corresponding UE.

If the total transmission power of a cell belonging to a TAG in the section in which two subframes overlap with each other exceeds a set maximum power value using one of the aforementioned methods as described above, the UE may give up the entire transmission or may control the total transmission power of the UE so that it does not exceed the maximum power value through an operation, such as the coordination of transmission power.

Figure 9:
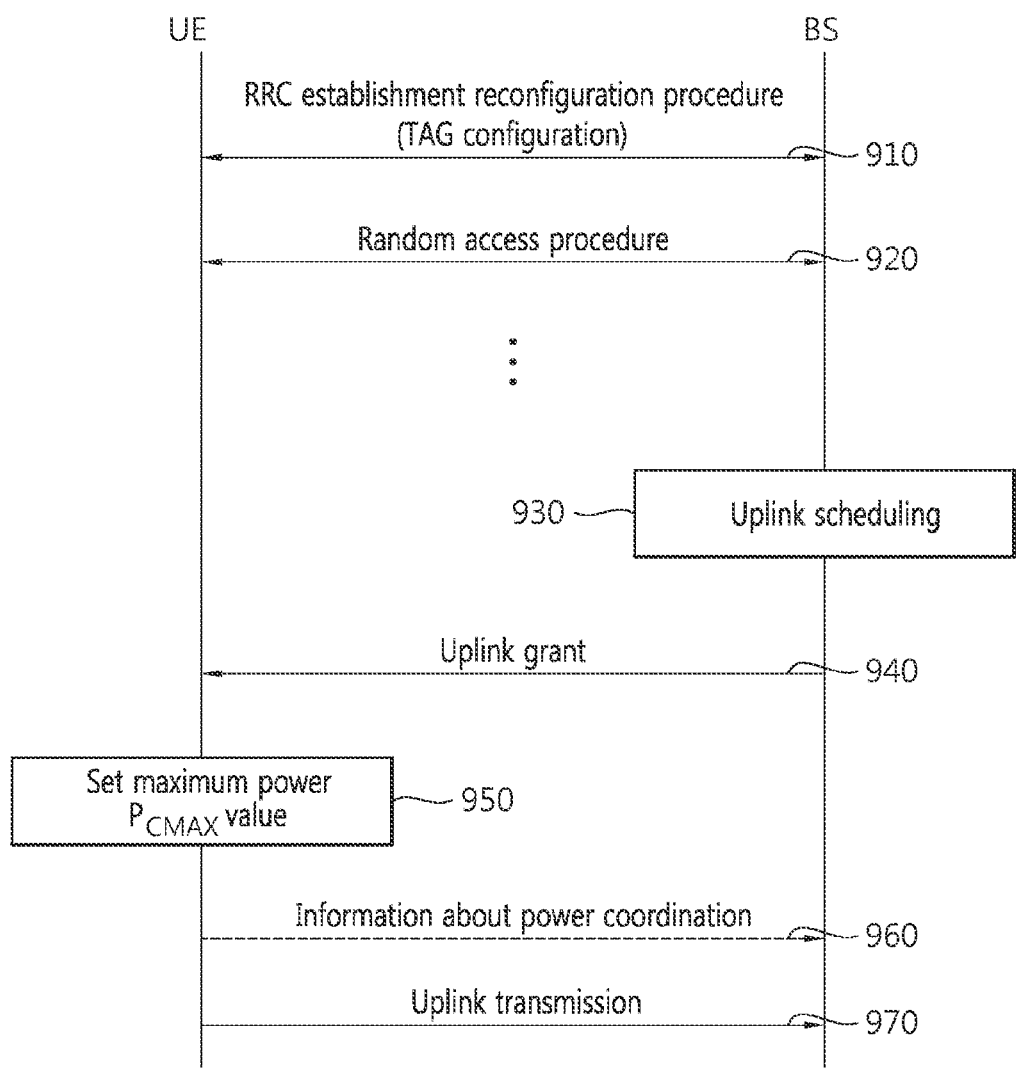
FIG. 9 is a diagram illustrating a series of procedures in which UE sets maximum transmission power and performs uplink transmission in accordance with an embodiment of the present invention.

FIG. 9 is a diagram illustrating a signaling scheme between UE and a BS in accordance with an embodiment of the present invention.

Referring to FIG. 9, the UE performs an RRC establishment reconfiguration procedure for a TAG configuration with the BS (910).

In this case, a TAG is reconfigured by the BS. The reconfiguration of the TAG may include a TAG configuration according to a cell-specific or eNB-specific criterion and a TAG configuration according to a UE-specific criterion. For example, in the TAG configuration according to the cell-specific criterion, the BS may reconfigure a TAG based on information about the deployment environment of a network. Furthermore, for example, in the TAG configuration according to the UE-specific criterion, the BS may reconfigure a TAG based on the timing advance value of a secondary serving cell that has been obtained based on a random access procedure. If the reception of uplink data is not received for a specific time or more through a secondary serving cell or the BS recognizes that the uplink synchronization of the secondary serving cell is not matched, the BS may reconfigure a TAG in such a way as to remove the secondary serving cell from the TAG so that the secondary serving cell is included in another TAG. Furthermore, if a timing advance value is identical with that of a pTAG in the state in which a secondary serving cell has been reconfigured as the pTAG when adding the secondary serving cell, the BS does not reconfigure a new sTAG. Alternatively, if a timing advance value is different from that of a pTAG and is identical with that of another sTAG when adding a secondary serving cell in the state in which the secondary serving cell has been reconfigured as the pTAG, the BS reconfigures the secondary serving cell as a corresponding sTAG.

Accordingly, the BS may send an RRC establishment reconfiguration message including TAG configuration information to the UE. The UE may reconfigure a TAG based on the TAG configuration information. The UE sends an RRC reconfiguration completion message to the BS.

In this case, the UE has not secured uplink synchronization regarding the secondary serving cell. If the UE tries to perform uplink transmission, it has to obtain a timing advance value that needs to be controlled with respect to the secondary serving cell. This may be implemented through a random access procedure indicated by the BS (920).

More specifically, the random access procedure may include, for example, a step of sending, by the BS, a PDCCH indication indicative of the start of the random access procedure regarding the secondary serving cell to the UE, a step of sending, by the UE, a random access preamble to the BS on the secondary serving cell, and a step of sending, by the BS, a random access response message to the UE on a primary serving cell. Thereafter, the UE may update the timing advance value of a new TAG based on a timing advance value included in the random access response message.

Accordingly, after performing the random access procedure along with the BS, the UE may start uplink transmission on the corresponding secondary serving cell using the timing advance value of the obtained TAG.

To this end, the BS performs uplink scheduling (930). In this case, the uplink scheduling includes determining the modulation method of the UE and resource blocks to be allocated within a range that does not exceed the maximum transmission power of the UE. In this case, the BS performs scheduling on each of the serving cells of the corresponding TAG on which uplink transmission will be performed.

The BS sends a determined uplink grant to the UE (940). The uplink grant is transmitted on a PDCCH as downlink control information (DCI) of the format 0 for allocating uplink resources to the UE. The uplink grant includes information, such as the RBs, modulation and coding scheme (MCS), and TPC of each serving cell.

The UE configures the maximum transmission power $P_{CMAX}$ by taking into consideration power coordination in a corresponding subframe and the maximum transmission power of each serving cell based on the number of RBs, the MCS, and the TPC included in the uplink grant (950).

In this case, in an environment in which multiple carriers are supported and different uplink groups are present, that is, when uplink transmission is to be performed through a serving cell belonging to a pTAG for a CA and a corresponding serving cell belonging to an sTAG, if the TA value of the pTAG is different from that of the sTAG, the UE according to the present invention checks the section in which the overlap of uplink transmission occurs with respect to each serving cell. Furthermore, the UE may set a maximum power value in $t_{overlap}$, that is, the overlap section of corresponding subframes, according to one of the methods described with reference to FIG. 8.

For example, regarding a maximum power value in the $t_{overlap}$, a smaller value of maximum power in the subframe n of a serving cell belonging to the pTAG and maximum power in the subframe n+1 of a serving cell belonging to the sTAG may be set as the maximum power ($P_{CMAX}$) value of the UE. Alternatively, the UE may calculate maximum power by applying a greater one of the MPRs of $n^{th}$ and $(n+1)^{th}$ subframes in the section in which the $n^{th}$ and the $(n+1)^{th}$ subframes overlap with each other. The smaller value is set so that the maximum transmission power configured in the UE is not exceeded. Alternatively, regarding a maximum power value in the $t_{overlap}$, the average value of a calculated maximum power value in each subframe and the two values may be applied as the maximum power value of the UE, or $P_{CMAX\_C_a\ PCell}$, that is, a maximum power value calculated in a corresponding subframe of or the pTAG, may be applied as the maximum power value of the UE. Alternatively, UE maximum power defined by a UE power class may be applied as the maximum power value of the UE, or a value for the plurality of serving cells obtained by adding or subtracting a specific offset value to or from the configured UE maximum power may be applied as the maximum power value of the UE.

In other words, in the present invention, the UE defines controlled maximum transmission power by taking into consideration the section in which the subframes of different TAGs that perform uplink transmission using different TAs with respect to maximum transmission power previously configured in the UE, that is, the maximum transmission power $P_{CMAX,C(i)}$ of the UE defined in a subframe i determined for a specific serving cell. That is, the UE calculates maximum transmission power in corresponding subframes of serving cells that perform uplink transmission, performs a comparison and check two or more pieces of maximum transmission power calculated in the corresponding subframes of the corresponding serving cells, and applies maximum transmission power for the overlap section. The reason for this is that maximum transmission power in an overlapped section is guaranteed within a range that does not exceed the configured maximum transmission power of the UE to the maximum extent by scaling (controlling) the maximum transmission power of a plurality of serving cells that perform uplink transmission.

Furthermore, according to the present invention, the maximum transmission power $P_{CMAX}$ of the UE may be changed every PUSCH transmission moment, that is, depending on a transmission form (modulation order, an RB, etc.) of a PUSCH. Accordingly, the UE configures the maximum transmission power $P_{CMAX}$ within a range of the configured maximum transmission power of the UE by taking into consideration the transmission type of the PUSCH of a corresponding serving cell of a TAG and the overlap situation of subframes for the uplink transmission of corresponding serving cells of TAGs.

In this case, the UE may send information about power coordination, including the applied maximum power value, to the BS (960). The information about the power coordination, as described above, may be information of a type that directly indicates the amount or range of the power coordination required for the UE to which a scheduling parameter has been allocated, may be index information indicative of a power coordination index that maps a sequence according to all the communication environments in which the UE may be placed and the amount or range of power coordination, or may be information configured in a form that includes communication environment information and a power coordination table index.

Thereafter, the UE sends uplink data to the BS using the uplink transmission power (970). For example, if subframes overlap with each other between TAG groups having different TA values, the UE send the uplink data by applying the maximum power value of the UE u sing one of the methods configured by the present invention.

According to the present invention, the BS may perform reception more efficiently through uplink transmission in subframes between which overlap has been controlled by taking into consideration the maximum transmission power of a plurality of serving cells included in TAGs within a range of the maximum transmission power of the UE. Furthermore, the BS may be aware of available transmission power that may be used by the UE more accurately by checking controlled power information. Accordingly, scheduling according to better link adaptation can be provided to the UE.

Figure 10:
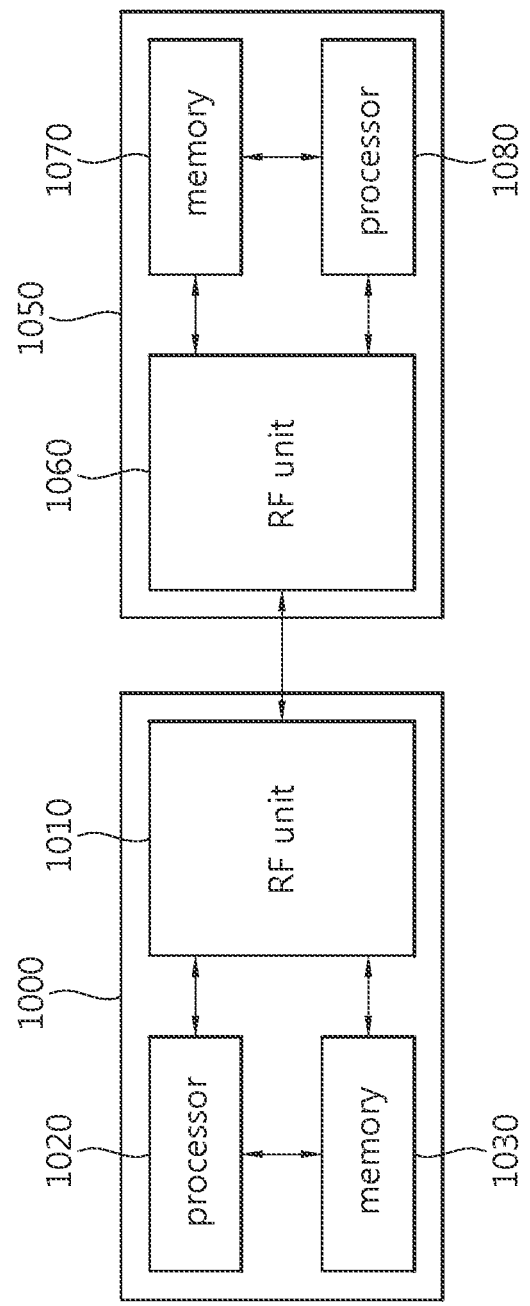
FIG. 10 is a block diagram schematically illustrating the structure of a wireless communication system in which an embodiment of the present invention is implemented.

FIG. 10 is a block diagram schematically illustrating the structure of an apparatus in which an embodiment of the present invention is implemented. The apparatus may be part of UE.

The apparatus 1000 includes a processor 1020, memory 1030, and a radio frequency (RF) unit 1010. The memory 1030 is connected to the processor 1020 and stores a variety of pieces of information for driving the processor 1020. The RF unit 1030 is connected to the processor 1020 and sends and/or receives radio signals. The processor 1020 implements the proposed functions, processes and/or methods. The operations of the UE according to the aforementioned embodiments of FIGS. 7 to 9 may be implemented by the processor 1020.

More specifically, the processor 1020 checks information about the serving cell of a TAG and the TA value of the corresponding serving cell received by the RF unit 1010. Furthermore, if it is checked that the subframes of corresponding serving cell that have independent UL TA values and perform uplink data transmission overlap with each other, the processor 1020 may compare the maximum transmission power of the UE for a corresponding overlap section with a calculated maximum power value in each subframe and set the power value of a subframe (a corresponding serving cell) having a minimum value as the maximum transmission power of the UE. Alternatively, the processor 1020 may configure the maximum transmission power of the UE by applying a greater MPR of MPRs to be applied in each subframe, that is, an MPR having a maximum value, to the maximum transmission power of the UE for the corresponding overlap section. Alternatively, the processor 1020 may configure the maximum transmission power of the UE as the average value of pieces of calculated maximum power in the subframes of corresponding serving cells or may configure the maximum transmission power of the UE as a maximum power value in the subframes of serving cells belonging to a pTAG. Alternatively, the processor 1020 sets a value, obtained by adding (subtracting) a specific offset value to (from) UE maximum power defined by a UE power class to UE maximum power, as the maximum power value of the UE and performs uplink transmission. The processor 1020 may be configured to include a PH/$P_{CMAX}$ calculation unit and a message configuration unit for configuring a PHR message.

The PH calculation unit of the processor 1020 calculates information about PH, $P_{CMAX,c}$ regarding a corresponding subframe that corresponds to each UL-configured serving cell in a corresponding subframe, that is, performs a comparison on $P_{CMAX,cN}$ and $P_{CMAX,cN+1}$ values calculated in subframes in an overlapped section, and configures the maximum transmission power of the UE using one of the four methods described with reference to FIG. 8. In this case, in the present invention, for example, the PHR message configuration unit of the processor 1020 may send information about the PH and $P_{CMAX,c}$ to a BS. According to the present invention, the apparatus that configures $P_{CMAX,c}$ may be a UE apparatus.

Meanwhile, the apparatus may be configured in a BS. In this case, the apparatus may perform the reverse operation of the UE processor as a concept paired with the UE apparatus. For example, the processor 1080 included in the BS may be included as a PHR message acquisition unit and a scheduler. The PHR message acquisition unit within the processor of the BS may check a PHR report including $P_{CMAX,c}$ from the UE, and the scheduler may perform an operation for more efficiently managing the uplink transmission resources of the UE applied through the checked $P_{CMAX,c}$ and PH.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include baseband circuits for processing radio signals. When the embodiment is implemented in software, the aforementioned scheme may be implemented as a module (a process, a function, etc,) for performing the aforementioned functions. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for configuring, by user equipment (UE), uplink transmission power in a wireless communication system, the method comprising:
    obtaining information about a configuration of time alignment groups (TAGs) of a plurality of serving cells and configuring the TAGs;
    checking whether an overlap section is present with respect to a subframe n and a subframe n+1 corresponding to the respective TAGs;
    calculating first maximum transmission power based on serving cells included in a first TAG in the subframe n;
    calculating second maximum transmission power based on serving cells included in a second TAG in the subframe n+1;
    deriving uplink transmission power $P_{CMAX}$ of the UE in the checked overlap section based on the first maximum transmission power and the second maximum transmission power, wherein a range of the derived uplink transmission power $P_{CMAX}$ is set within a range not exceeding maximum transmission power $P_{CMAX}$ previously configured in the UE; and performing uplink transmission through corresponding serving cells of the TAGs using the derived uplink transmission power $P_{CMAX}$ of the UE in the checked overlap section.

2. The method of claim 1,
wherein the uplink transmission power $P_{CMAX}$ of the UE in the checked overlap section is derived as maximum transmission power having a smaller value of the first maximum transmission power and the second transmission power.

3. The method of claim 2, wherein the step of deriving the uplink transmission power $P_{CMAX}$ of the UE in the checked overlap section comprises:
configuring the uplink transmission power $P_{CMAX}$ of the UE in the checked overlap section by applying power coordination MPR having a greater value of power coordination calculated in the subframe n and power coordination calculated in the subframe n+1.

4. The method of claim 1, wherein the step of deriving the uplink transmission power $P_{CMAX}$ of the UE in the checked overlap section comprises:
configuring an average value of the first maximum transmission power and the second maximum transmission power as the uplink transmission power $P_{CMAX}$ of the UE in the checked overlap section.

5. The method of claim 1, wherein the step of deriving the uplink transmission power $P_{CMAX}$ of the UE in the checked overlap section comprises:
calculating third maximum transmission power based on serving cells included in a pTAG in a subframe of a pTAG including a primary serving cell PCell; and
configuring the third maximum transmission power as the uplink transmission power $P_{CMAX}$ of the UE in the checked overlap section.

6. The method of claim 1, wherein the step of deriving the uplink transmission power $P_{CMAX}$ of the UE in the checked overlap section comprises:
configuring UE maximum power, defined by a UE power class configured in the UE, as the uplink transmission power of the UE in the checked overlap or calculating fourth maximum transmission power by adding or subtracting a specific offset of serving cells that perform uplink transmission from the previously configured maximum transmission power of the UE and configuring the fourth maximum transmission power as the uplink transmission power $P_{CMAX}$ of the UE in the checked overlap section.

7. The method of claim 1, wherein the step of deriving the uplink transmission power $P_{CMAX}$ of the UE in the checked overlap section comprises:
configuring a smaller value of maximum power of the UE defined by a UE power class configured in the UE and maximum power calculated as a sum of pieces of maximum permitted power for the serving cells of the TAGs as the uplink transmission power $P_{CMAX}$ of the UE in the checked overlap section.

8. The method of claim 1, further comprising:
calculating maximum transmission power by based on serving cells included in a corresponding TAG in the subframe n and calculating maximum transmission power based on serving cells included in a corresponding TAG in the subframe n+1;
checking a subframe that exceeds the previously configured maximum transmission power $P_{CMAX}$ of the UE in maximum transmission power calculated in the subframe n and maximum transmission power calculated in the subframe n+1, and
controlling the uplink transmission of the corresponding TAG in the corresponding subframe that exceeds the maximum transmission power of the UE.

9. An apparatus for configuring uplink transmission power of UE in a wireless communication system, the apparatus comprising:
a radio frequency (RF) unit sending and receiving radio signals; and
a processor connected to the RF unit,
wherein the processor obtains information about a configuration of time alignment groups (TAGs) of a plurality of serving cells and configuring the TAGs, checks whether an overlap section is present with respect to a subframe n and a subframe n+1 for uplink transmission in the TAGs, calculates first maximum transmission power based on serving cells included in a first TAG in the subframe n, calculates second maximum transmission power based on serving cells included in a second TAG in the subframe n+1, derives uplink transmission power $P_{CMAX}$ of the UE in the checked overlap section based on the first maximum transmission power and the second maximum transmission power, where a range of the derived uplink transmission power PCMAX is set within a range not exceeding maximum transmission power $P_{CMAX}$ previously configured in the UE, and performs uplink transmission through corresponding serving cells of the TAGs using the derived uplink transmission power $P_{CMAX}$ of the UE in the checked overlap section.

10. The apparatus of claim 9, wherein the processor configures maximum transmission power that belongs to the first maximum transmission power and the second maximum transmission power and that has a smaller value as the uplink transmission power $P_{CMAX}$ of the UE in the checked overlap section, and
wherein deriving the uplink transmission power $P_{CMAX}$ of the UE in the checked overlap section further comprises configuring the uplink transmission power $P_{CMAX}$ of the UE in the checked overlap section by applying power coordination MPR having a greater value of power coordination calculated in the subframe n and power coordination calculated in the subframe n+1.

11. The apparatus of claim 9, wherein the processor configures an average value of the first maximum transmission power and the second maximum transmission power as the uplink transmission power $P_{CMAX}$ of the UE in the checked overlap section.

12. The apparatus of claim 9, wherein the processor calculates third maximum transmission power based on serving cells included in a pTAG in a subframe of a pTAG including a primary serving cell PCell and configures the third maximum transmission power as the uplink transmission power $P_{CMAX}$ of the UE in the checked overlap section.

13. The apparatus of claim 9, wherein the processor configures UE maximum power, defined by a UE power class configured in the UE, as the uplink transmission power of the UE in the checked overlap section or calculating fourth maximum transmission power by adding or subtracting a specific offset of serving cells that perform uplink transmission from the previously configured maximum transmission power of the UE and configures the fourth maximum transmission power as the uplink transmission power $P_{CMAX}$ of the UE in the checked overlap section.

14. The apparatus of claim 9, wherein the processor configures a smaller value of maximum power of the UE defined by a UE power class configured in the UE and maximum power calculated as a sum of pieces of maximum permitted power for the serving cells of the TAGs as the uplink transmission power $P_{CMAX}$ of the UE in the checked overlap section.

15. The apparatus of claim 9, wherein the processor checks a subframe that exceeds the previously configured maximum transmission power $P_{CMAX}$ of the UE in maximum transmission power calculated in the subframe n and maximum transmission power calculated in the subframe n+1, and controls the uplink transmission of the corresponding TAG in the corresponding subframe that exceeds the maximum transmission power of the UE.

* * * * *